Patented Feb. 13, 1951

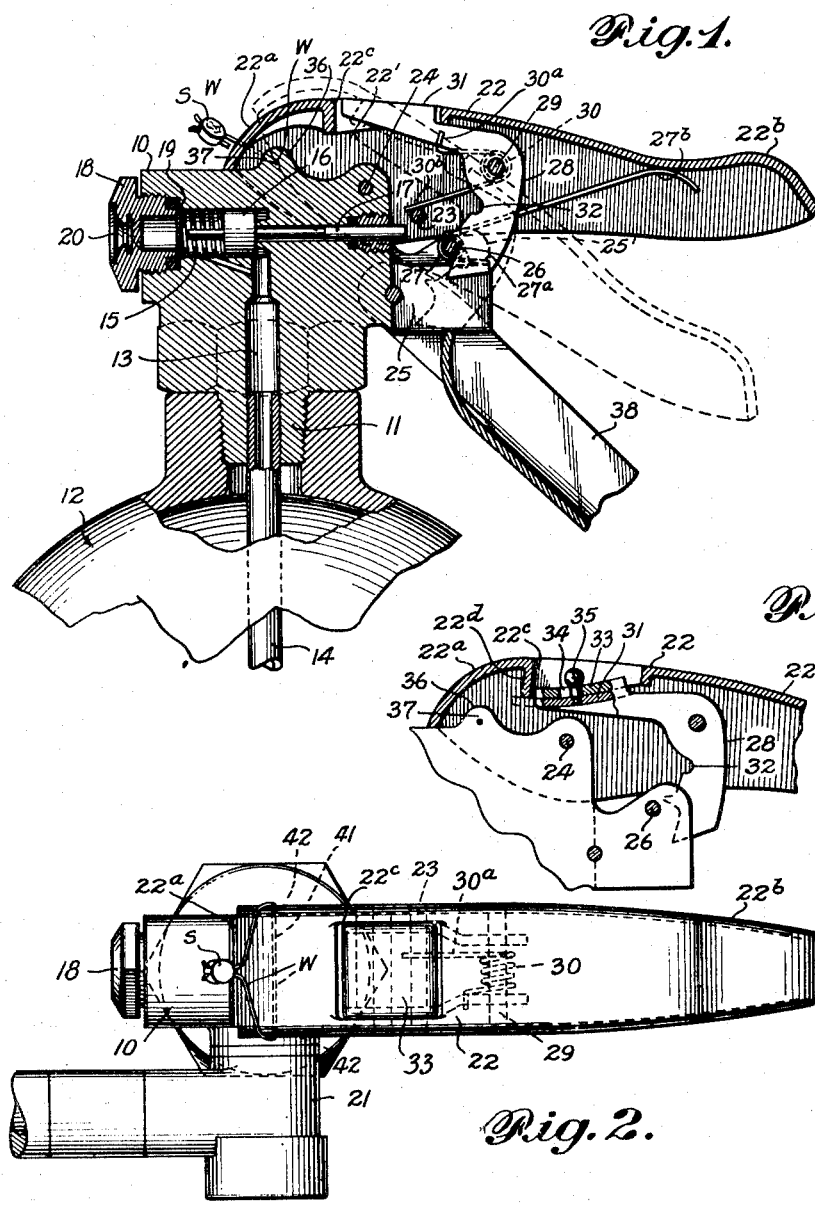

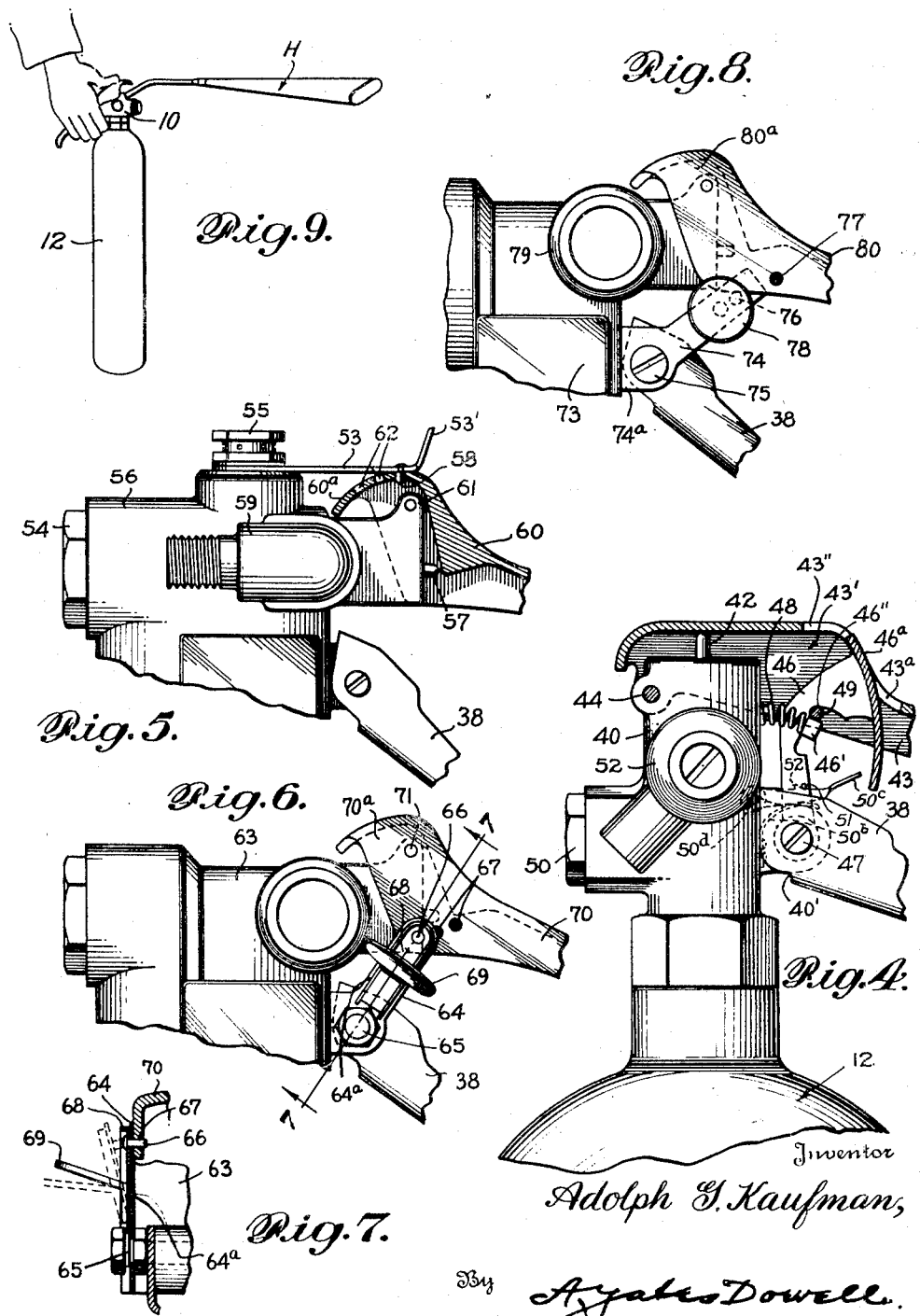

2,541,073

UNITED STATES PATENT OFFICE 2,541,073

VALVE LOCKING MECHANISM

Adolph G. Kaufman, Washington, D. C.

Application January 6, 1944, Serial No. 517,254

4 Claims. (Cl. 169—31)

This invention relates to valve operating means and more particularly to a means for controlling the actuation of such valve operating means, the valve operating means being ordinarily, but not necessarily, employed in connection with fire extinguishers, flame throwers and the like, and being operable to determine the passage of fluids, either liquid or gaseous, or powder under pressure.

Heretofore portable fire extinguishers have been in use and these could be operated to extinguish a fire, same usually embodying a high pressure cylinder, or tank, or other container charged with a substance for extinguishing a fire, as for example carbon dioxide or other substances, the cylinder etc. being equipped with a hand valve for controlling the discharge of its contents through a tube, horn, or nozzle of the desired character. The valve operating means has been in the form of a rotatable or swingable handle, and it has been customary to provide these handles at the factory with detachable locking pins for preventing accidental discharge in transit, tampering with, or surreptitious operation of the valve, prior to its use in extinguishing a fire. This type of construction has certain objectionable features in that, among other things, it is clumsy and awkward to operate quickly by a single individual since it is necessary to support the cylinder, container, etc., to hold the discharge nozzle or horn, to pull the pin out, and then to manipulate the valve to open same, all of which results in loss of time in the operation of the fire extinguisher.

The present invention contemplates the provision of a simplified valve more readily operable.

It is an object of the invention to provide an improved valve assembly, and operating means therefor, complete operation of which can be quickly accomplished while carrying the entire apparatus with one hand, including the rupture of the lead wire seal on the detachable locking pins, opening or closing the valve itself, or the locking of the valve in open, intermediate, or closed position, as well as the unlocking of same from either of these positions.

Another object of the invention is to provide an improved valve assembly including a plug allowing for easy access to the interior of the valve body and which plug seats tightly, a calibrated rupturable safety disc within the bore of the valve body, and divergent multiple ports to permit gases to escape upon rupture of the disc due to dangerous pressure within the cylinder, tank, etc., and a second disc adapted to be blown out to indicate that the safety disc has been ruptured and the apparatus is inoperative.

A further object of the invention is to provide an improved valve which can be manufactured with a substantial saving in materials, labor, weight, number of parts, time, and cost and which involves generally simplified and more effective safety features; a valve in which certain parts of the mechanism are shielded against damage and in which the valve construction is arranged to require the least effort to operate same, and in which provision is made for easy access to the internal valve mechanism.

Referring to the drawings:

Fig. 1 is a longitudinal section illustrating one embodiment of my improved valve assembly with the movable parts in locked position and the valve attached to a cylinder, or tank, containing fluid under pressure and showing in dotted lines the positions of the associated parts after the latching mechanism and the operating handle have been moved to open position and the seal wire ruptured;

Fig. 2, a top plan of the valve assembly of Fig. 1 and showing the swivel discharge connection;

Fig. 3, a detail sectional view similar to Figure 1 but including a control member for holding the latching mechanism in unlocked position to permit the operating handle to function;

Fig. 4 shows a modification in which the main body of the valve and the valve stem are positioned vertically, the associated valve operating and latching mechanisms being shown in valve closed position;

Fig. 5 is a view showing the outlines of an old style valve with two plugs, one affording access to the interior of the valve, and the other affording access to the safety rupturable diaphragm, and a modified form of latching mechanism adapted to be attached to the valve subsequent to manufacture;

Fig. 6, a modified form of latching mechanism easily attachable to the body of the old style valve;

Fig. 7, a detail sectional view on the line 7—7 of Figure 6;

Fig. 8 is a view similar to that of Fig. 6 showing a still further modified form of the latching mechanism, and Fig. 9, a diagrammatic view of a fire extinguisher embodying the improved valve held and operated in one hand.

Referring to the drawings, the hollow valve body 10 has a threaded boss 11 adapted to be screwed into a cylinder or tank 12 for liquid, gaseous, or powdered substance under pressure usable in the fighting of fires or in other capacities. The threaded boss of the valve body is provided with a bore 13 which receives the substance under pressure from a siphon tube 14 which is threaded into the boss 13 and extends adjacent to the bottom of the cylinder or tank. Communication between the inlet bore 13 and the outlet bore 15 is controlled by a conventional piston valve 16 having a stem 17 projecting exteriorly of the valve body 10 for operation to unseat the valve and permit flow through the valve body. One end of the bore 15 in the valve body is enlarged and screw threaded to provide for a closure plug 18, which has the dual function of affording access to the bore 15 and providing a safety means. The latter comprises a membrane or disc 19 held in place by the inner end of the plug 18 at the juncture of the outer enlarged section and the main bore 15. As will be readily apparent from an examination of Fig. 1 of the drawings, the stem 17 projects forwardly of the valve 16, terminating a short distance from the membrane 19, for a purpose to be hereinafter more fully described. The membrane or disc 19 is of predetermined strength so that it will rupture at a predetermined pressure. The closure plug 18 also is provided at its outer end with a transparent "Cellophane" disc, or the like, 20 which will be blown out when the membrane or disc 19 is ruptured. This serves as an indicator to show that a rupture of the membrane or disc 19 has taken place and the entire apparatus has been made inoperative. The bore 15 is connected to a discharge passage formed in a swivel joint 21 (Figure 2). The swivel joint 21 is so connected to the valve body 10 that it may be disposed at any desired angle in its plane of rotation for ejecting the fire extinguishing fluid through a tube or horn H (Figure 9) onto a fire.

An operating lever 22 is provided for engaging the valve stem 17 and reciprocating the latter to unseat the valve 16, whereby the forwardly projecting extremity of the valve stem will be brought into contact with the membrane 19 to cause the rupture thereof and permit the passage of the contents of the cylinder 12. This lever 22 consists of an elongated body disposed diametrically of the valve body 10 and having parallel downwardly depending side flanges 22' which partially receive the valve body and through which flanges and the valve body a pivot pin 24 extends so that the lever may pivotally or hingedly operate thereupon. The short end 22a of the lever 22 engages the valve body 10 and limits the movement of the lever in one direction while the movement of the latter in the opposite direction is limited by engagement of the valve stem 17 with a pin 23 having its ends mounted in the parallel side flanges 22' of the lever. Due to the fact that the valve 16 is normally maintained in closed position with its stem projecting outwardly, it is necessary to depress the operating lever 22 about its pivot 24 to cause the opening of the valve. The valve body 10 is provided with a rearwardly projecting portion 25. In some forms of this type of valve, a carrying handle is provided for facilitating portability of the apparatus and such a handle is here shown at 38 attached to the rearwardly extending portion 25 of the valve body by suitable pivot means. Such a carrying handle however forms no part of the present invention as the apparatus could be readily carried, for instance, by grasping the rearwardly extending portion 25 of the valve body directly. Formed on the rearwardly extending portion 25 of the valve body 10 there are upwardly extending parallel ears 25'. A pin 26 extends through these ears and a coil spring 27 surrounds this pin, one end 27a of this spring bearing against the rearwardly extending portion 25 of the valve body and the other end 27b bearing against the longer end 22b of the operating lever 22. The spring 27 thus tends to maintain the operating lever in elevated position, thereby permitting the spring 15 to maintain the valve 16 seated.

In order to enable the operating lever 22 to be held in a definite operative position, a latch 28 of bell crank lever form is provided and is pivoted on a pin 29 which extends through the side flanges of the operating lever 22. This latch has on its upper crank arm a button 31 which extends freely in a suitable recess 22c in the operating lever 22 so that the top surfaces of the button and the operating lever are substantially co-planar. A coil spring 30 surrounds the pin 29 and one end 30a of this spring rests under the button 31 on the latch 28 while the other end 30b abuts the valve operating pin 23. This latch has in its lower crank arm, below the pivot pin 29, a notch 32 which, when the operating lever 22 and the latch 28 are depressed, will engage the pin 26, thereby holding the operating lever and latch depressed and the valve 16 in open position. The latch 28 has a projecting portion 28' which engages the pin 26 so that the lever 22 cannot be depressed until the button 31 has been pushed down so as to remove the said projecting portion 28' from above the pin 26. Release of the operating lever and the latch from locked position is accomplished by manual depression of the button 31 which swings the lower crank arm of the latch and the notch 32 therein clear of the pin 26 and allows the springs 27 and 30 to return the operating lever 22 and the latch 28, respectively, to their normal positions, this position of the operating lever being determined by the short end 22a of the lever abutting the valve body 10, and the return of the operating lever 22 to its normal position permitting the spring 15 to force the valve 16 to closed or seated position.

In the construction of Figure 3 a holding means is provided for the latch 28 to hold the operating lever 22 in an intermediate position between the closed valve position, wherein the short end 22a of the operating lever abuts the valve body 10, and the position just prior to engagement of the valve stem 17 by the valve operating pin 23. This holding means takes the form of a slidable member 33 which rests on the button 31 on the upper crank arm of the latch 28. The slidable member 33 has a longitudinal slot 34 therein and a screw 35 extends through this slot and is threadably secured in the button 31 so as to allow only limited relative slidable movement of the member 33 with respect to the button 31, this motion being along the axis of the operating lever 22. When the operating lever 22 and the latch 28 are partially depressed, the member 33 may be slid forwardly by finger pressure to the dotted line position of Figure 3 in which position it engages a wall member 22d which partially forms the recess 22c in the operating lever 22.

With the above construction and the parts in the positions described, the apparatus may be effectively used in the combatting of a plurality of closely located fires, or for other intermittent spraying. The slidable member 33 holds the latch 28 with its lower crank arm swung rearwardly so that upon oscillation of the operating lever 22 the notch 32 in the latch will not engage the pin 26. Thus the operating handle 22 may be repeatedly oscillated to operate the valve 16. It is in this connection that the spring 27 plays its part, that is in returning the operating handle 22 from the intermediate to the normal non-operating position, wherein the short end 22a of the operating lever abuts the valve body 10; otherwise the spring 15 is fully effective to return the valve 16 to its seat.

When cylinders or tanks having valves of the character here described and containing carbon dioxide gas or the like are shipped from the factory, a wire W and a lead seal S are required by the Underwriters or other authorities and the wire and seal attached in accordance with these requirements is ordinarily difficult to remove as the seal must be torn or the wire cut. In the present invention however, a boss 36 is provided on the valve body 10 and a hole 37 is formed therein. The side flanges 22' of the operating lever 22 are provided with holes (not shown) which register with the hole 37 in the boss when the operating lever is raised to non-operating with its short end 22a resting against the valve body 10. Through these holes in the side flanges 22' of the operating lever and the hole 37 in the boss 36 the wire is run before the seal is attached. In order to dispose of the wire and seal, all that is necessary is for the operating lever 22 to be unlocked by pushing the button 31 in its upper surface and the lever may then be swung about its pivot 24 to shear the wire of the seal.

Figure 4 illustrates another modification of the valve in which the main body 40, including the valve stem 42, is vertically disposed. The valve body is provided with a swivel joint 52 to which a tube or horn H (see Fig. 9) for ejecting the fire extinguishing fluid on the fire may be attached as in the construction of Figure 1, and also the body 40 has a threaded portion at the lower end which is adapted to be screwed into a cylinder or tank 12. The valve stem 42 extends from the top of the body 40 and is spring biased and is adapted for depression to unseat the valve in the same manner as the valve stem 17 in the modification of Figure 1. The valve operating lever 43 is mounted on the valve body 40 by means of a pivot 44. Spaced side flanges 43' on the valve operating lever 43 serve as a shield for the working parts. A latching element 46 is pivoted at 47 to a rearwardly extending boss 40' on the valve body. A spring 48 is positioned between the valve body 40 and an abutment 46' on the latching element 46. A pin 49 extends through the side flanges 43' of the valve operating lever and the spring 48 biases the latching element to the position shown, wherein a notch 46'' in the latching element 46 is engaged over the pin 49. The latching element in this position blocks the valve operating lever 43 in the raised position in which it allows the valve stem 42 to be in its raised position where the valve is maintained on its seat to prevent discharge of fluid from the tank 12. The latching element 46 has as its end a button 46a formed as an arcuate section which extends through a cut-away section 43'' in the valve operating lever 43. As thus arranged, the operator may manipulate the latching element 46 with a finger of the same hand that holds the entire unit and operates the valve operating lever.

As in the construction of Figure 3, a holding means for the latching element 46 is here also provided. This holding means here takes the form of a locking lever 50c pivoted at 50d on the valve body 40. This locking lever is biased upwardly by a flat spring 50b, here shown as of arcuate form, and also attached to the valve body 40. There is provided on the locking lever 50c, a tooth 52 adapted to cooperate with a pin 51 carried by the latching element 46. When the latching element 46 is moved to the extreme forward position the pin 51 thereon will be engaged by the tooth 52 on the locking lever to hold the latching element in this position wherein the pin 49 will not be engaged by the latching element 46 when the valve operating lever 43 is oscillated. The outer end of the locking lever 50c is conveniently disposed with respect to the valve operating lever so that, as in the previous constructions, the valve operating lever and valve stem 42 may be locked in the raised and valve closed positions, respectively, or in the depressed and valve open positions, respectively, or may also be locked in an intermediate position wherein operation of the valve may be effected in the same manner as described in the construction of Figures 1 and 3.

The valve body is provided with a removable plug 50, similar to the plug 18 shown in Figure 1, beneath which is adapted to be confined a rupturable membrane or disc, similar to the membrane or disc 19, as also shown in Figure 1.

Likewise the valve body 40 is provided with a hole 51 and the side flanges 43' of the valve operating lever 43 are provided with similar holes (not shown) which register with the hole 51 when the operating lever is in raised or non-operating position, and which holes are adapted to receive the seal wire W, similar to the hole 37 in the valve body 10 and the holes in the side flanges 22' of the operating lever 22 of Figure 1.

Figures 5, 6 and 8 illustrate the invention as applied to valves which have already been manufactured and are in use, and in these modifications the invention is designed to be easily and readily attached to the valves in the field without altering the forms of these valves.

Fig. 5 shows the invention as applied to one form of old style valve wherein the screw plug 54 performs the functions of providing further machining of the interior of the valve during manufacture and accessibility of valve, stem, spring, etc., as in Fig. 1, while the safety feature is embodied in a separate screw member 55 which holds the rupturable membrane or disc 19 (see Fig. 1) and which is positioned in a suitable threaded aperture in the top of the valve body 56. The latching member here takes the form of a flat metal strip 53 which at one end has a hole therethrough for receiving the screw member 55 and at the other end has a detent 58 and a finger piece 53'. In the event that the valve should have the safety screw member 55 in some other position, for instance on the opposite side of the valve body 56 to the outlet swivel connection 59 the latching member 53 would be attached to the top of the valve body 56 by any other suitable securing means such as a bracket, clamp, screws, etc. The valve operating lever 60 is pivoted to the valve body at 61 and has its forward end 60a of arcuate shape, and in this arcuate section there is formed a longitudinal row of holes 62. Valve stem 57 functions in the same manner as valve stem 17 in the construction of Fig. 1. It will again be obvious that the operator may manipulate the latch 53 with one finger of the same hand that operates the valve operating handle 60 and carries the apparatus to latch the operating handle and valve in closed, intermediate or open position.

In the construction of Figs. 6-7 the latching means here comprises principally a flat spring member 64 which is mounted on the valve body 63 by a pin 65 which may or may not be the pin which mounts the carrying handle 38. This spring member has a vertical face 64a which abuts the valve body 63, this engagement preventing locking. The flat spring member 64 carries a detent pin 66 at its upper end. The valve operating handle 70 is pivoted to the valve body at 71 by a pivot pin through its side flanges 70a as in the previous constructions. This handle has in one side flange 70a a plurality of holes 67 in which the detent 66 is adapted to engage. A reinforcing member 68 is secured to the flat spring member 64 by the detent pin 66 and below this point of attachment the reinforcing member is provided with an outwardly and upwardly extending fingerpiece 69. It will again be obvious that the latching means can be manipulated by the operator with one finger of the same hand that operates the valve operating handle 70 to open, closed or intermediate positions and also carries the apparatus.

In the construction of Fig. 8 the latching means again comprises a flat spring member 74 which is secured to the valve body 73 by a pivot 75 and abuts same at 74a as in the construction of Figs. 6-7. In this construction, however, the flat spring member 74 extends upwardly on the inside of one of the side flanges 80a of the valve operating handle 80 and the detent 76 engages the holes 77 in the side flange 80a of the valve operating lever 80 on the inner face of said flange. A fingerpiece 78 is provided on a flat spring member and is operable to push the flat spring member 74 inwardly to release the detent 76 from one of the holes 77 in the side flange 80a of the operating lever 80. Likewise as in the previous constructions it will be obvious that the latching means may be manipulated by one finger of the hand of the operator which operates the valve operating handle and carries the apparatus to latch the operating handle and valve in open, closed or intermediate position.

Fig. 9 illustrates the operation of the fire extinguisher in actual practice, same being supported and operated by one hand of the operator, leaving the other hand free.

It will be understood that certain minor changes in construction and design may be adopted without departing from the spirit or scope of the invention as defined by the appended claims.

What is claimed is:

1. A valve for connection with a fire extinguisher for controlling the discharge from said extinguisher and comprising a housing, a valve member in said housing, an operating lever pivoted on said housing for actuating said valve member to permit discharge from said fire extinguisher, a removable plug affording access to the interior of said housing, a rupturable member associated with said plug operable to afford relief to the interior of said fire extinguisher upon the building up of excessive pressure therein, means carried by the valve member for rupturing said rupturable member upon actuation of said valve member, an indicator indicating whether said rupturable member has been broken, latch means for maintaining said operating member in a definite position, spring means engaging said latch, a release for said latch to allow said lever to be operated, said lever having a hollow portion substantially enclosing and providing a protective housing for said latch and associated parts, the construction and relation of the parts permitting said valve and associated parts to be held and operated with one hand.

2. A valve for connection with a fire extinguisher for controlling the discharge from said extinguisher and comprising a housing, a valve member in said housing, an operating lever pivoted on said housing for actuating said valve member to permit discharge from said fire extinguisher, a removable plug affording access to the interior of said housing, a rupturable member associated with said plug operable to afford relief to the interior of said fire extinguisher upon the building up of excessive pressure therein, a projection on the valve member for rupturing said rupturable member upon actuation of said valve member, a frangible diaphragm carried by said plug for indicating whether said rupturable member has been broken, latch means for maintaining said operating lever in a definite position, spring means for engaging said latch, and a release for said latch to allow said lever to be operated, said lever having a hollow portion substantially enclosing and providing a protective housing for said latch and associated parts, the construction and relation of parts permitting the valve and associated parts to be held and operated with one hand.

3. A valve for connection with a fire extinguisher for controlling the discharge from said extinguisher and comprising a housing, a valve member in said housing, an operating lever pivoted on said housing for actuating said valve member to permit discharge from said fire extinguisher, a removable plug affording access to the interior of said housing, a rupturable member associated with said plug operable to afford relief to the interior of said fire extinguisher upon the building up of excessive pressure therein, means carried by the valve member for rupturing said rupturable member upon actuation of said valve member, an indicator indicating whether said rupturable member has been broken, latch means for maintaining said operating member in a definite position, spring means engaging said latch, a release for said latch to allow said lever to be operated, said lever having a hollow portion substantially enclosing and providing a protective housing for said latch and associated parts, and sealing means frangible upon manipulation of the operating lever for indicating that said valve has not been operated, the construction and relation of the parts permitting said valve and associated parts to be held and operated with one hand.

4. In a fire extinguisher, a container for fluid, a valve attached to said container, said valve including a housing having a main bore communicating with said container by means of a first bore and having an outlet for normal use, a removable plug provided with an aperture closing said outlet, a plunger reciprocable in said main bore and adapted in one position to block communication between said first and main bores and in another position to permit such communication, an operating lever pivoted on said housing for actuating said plunger, a first rupturable member positioned across the outlet of said main bore, a second and more easily rupturable member positioned across the aperture in said removable plug, a projection on said plunger extending forwardly thereof for rupturing said first rupturable member upon actuation of said plunger, said housing being further provided with a second bore providing communication between said first and main bores whereby when said plunger blocks communication between said first and main bores the pressure within said container is communicated through said second bore to said first rupturable member in order that said member may be ruptured in the event of the attainment of a predetermined pressure in said container, breaking said second and more easily rupturable member also and permitting the relief of pressure in said container, and a wire extending through said housing and surrounding a portion of said operating lever and having its ends sealed by conventional sealing means, whereby actuation of said operating lever will break said wire and actuate said plunger to rupture said first rupturable member and permit the escape of fluid to break said second rupturable member in order that inspection of the valve will indicate whether fluid has escaped from the container through the normal use thereof or due to the attainment of a predetermined pressure therein.

ADOLPH G. KAUFMAN.

REFERENCES CITED

The following references are of record in the file of this patent:

UNITED STATES PATENTS

| Number | Name | Date |
|---|---|---|
| Re. 22,045 | Towart, Jr. | Mar. 3, 1942 |
| 255,730 | Holland, Jr. | Mar. 28, 1882 |
| 994,955 | Sayre | June 13, 1911 |
| 1,099,767 | Read | June 6, 1914 |
| 1,130,500 | Ellis | Mar. 2, 1915 |
| 1,362,745 | Sample | Dec. 21, 1920 |
| 1,933,234 | Wakefield | Oct. 31, 1933 |
| 1,966,562 | Roach | July 17, 1934 |
| 2,039,014 | Mapes | Apr. 28, 1936 |
| 2,195,811 | Bramsen et al. | Apr. 2, 1940 |
| 2,208,850 | Mayer | July 23, 1940 |
| 2,213,748 | Stettner | Sept. 3, 1940 |
| 2,238,693 | Geertz | Apr. 15, 1941 |
| 2,375,615 | Boal | May 8, 1945 |
| 2,393,346 | Stroop | Jan. 22, 1946 |
| 2,454,621 | Allen | Nov. 23, 1948 |

FOREIGN PATENTS

| Number | Country | Date |
|---|---|---|
| 8,523 | Great Britain | 1904 |
| 467,699 | Great Britain | 1937 |